United States Patent Office 3,772,286
Patented Nov. 13, 1973

3,722,286
7-UREIDOCEPHALOSPORINS
John R. E. Hoover, Glenside, Pa., assignor to Smithkline Corp., Philadelphia, Pa.
No Drawing. Filed Dec. 6, 1971, Ser. No. 205,318
Int. Cl. C07d 99/24
U.S. Cl. 260—243 C
10 Claims

ABSTRACT OF THE DISCLOSURE

Cephalosporin compounds, substituted with the ureido and heterocyclicthiomethyl groups at positions 7 and 3 respectively, are prepared. These compounds are antibacterial agents.

---

This invention relates to cephalosporin compounds that have antibacterial activity. In particular, it is concerned with 7 - ureido-3-heterocyclicthiomethylcephalosporins.

The compounds of this invention are represented by the following general structural formula:

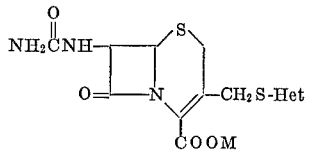

where Het is a 5 or 6 membered heterocyclic ring containing 1 to 4 atoms selected from the group N, O and S, unsubstituted or substituted with from one to two groups selected from the group consisting of lower alkyl of 1–4 carbon atoms, lower alkoxy of 1–4 carbon atoms, cyclopropyl, allyl, $CF_3$, $SCH_3$, halogen, amino, lower alkylamino or dialkylamino each alkyl containing 1–4 carbon atoms; and M is hydrogen, alkali metal cation, alkaline earth cation, or a nontoxic organic ammonium cation.

The preferred compounds are those where Het is 1,3,4-thiadiazol-2-yl, 1,2,4-triazol-3-yl, 1,3,4 - oxadiazol-2-yl, 1,2,4 - thiadiazolyl, tetrazol-5-yl, pyridyl, pyrimidyl, or pyrazinyl, all of which may be unsubstituted or substituted with one or more of the substituents which were enumerated above. Particularly preferred are the lower alkyl (1–4 carbon atoms) substituted 5-membered heterocyclic compounds, that is, 5-alkyl-1,3,4-thiadiazol-2-yl, 5-alkyl-1,3,4-oxadiazol-2-yl, 2-alkyl-1,2,4-triazol-3-yl, 4-alkyl-1,2,4-triazol-3-yl, 5-alkyl-1,2,4-triazol-3-yl, 4,5-dialkyl-1,2,4-triazol-3-yl and 1-alkyltetrazol-5-yl.

The compounds of this invention are prepared from 7 - aminocephalosporanic acid (7-ACA), the mercaptoheterocyclic compound, and potassium cyanate. More specifically, the reaction of 7-ACA with the mercaptoheterocyclic compound results in the displacement of the acetoxy group of 7-ACA to give the 3-heterocyclicthiomethyl-substituted compound. This reaction is run in water or a water-acetone solvent system at the reflux temperature of the solvent until the reaction is completed as indicated by the disappearance of the acetoxy carbonyl in the infrared absorption spectrum. The product obtained from the displacement reaction is then treated at room temperature with an aqueous solution of potassium cyanate or other cyanate salt to yield the compounds of this invention. The order of these two reactions may be reversed. Normal purification techniques, such as chromatography and recrystallization, may be employed to purify the compounds.

Also included within the scope of this invention are the nontoxic alkali metal, alkaline earth or organic ammonium salts, all of which also have antibacterial activity. These may be isolated directly from the final reaction as in the case when an alkali cyanate salt is used or can be prepared from the free acid by reaction with the appropriate base.

The compounds of this invention have greatly improved antibacterial activity against both Gram-positive and Gram-negative bacteria over the known 7-ureidocephalosporanic acid. For example, this compound had minimum inhibitory concentrations (MIC) against Staph. aureus, Strep. faecalis, E. coli, Klebsiella penumoniae, and Enterobacter aerogenes of 6.3, 100, 25, 25 and >200 µg./ml., respectively. Against the same bacteria, 3-(5-methyl-1,3,4-thiadiazol - 2 - ylthiomethyl)-3-cephem-4-carboxylic acid had MIC's of 1.6, 25, 6.3–12.5, 3.1–6.3, and 50 µg./ml., respectively.

The compounds are formulated into injectable compositions in the same manner as other cephalosporin antibacterials. The does that is administered to the subject will depend on the severity and type of infection as well as the general condition of the subject.

The following examples are presented to illustrate the invention further but are not to be construed to limit the scope thereof.

EXAMPLE 1

3-(5-methyl-1,3,4-thiadiazol-2-ylthiomethyl)-7-ureido-3-cephem-4-carboxylic acid To a suspension of 7-ACA (18.6 g., 0.05 mol) in a 2:1 water-acetone mixture (150 ml.) was added 5% $NaHCO_3$ until solution was complete. To this solution was added 2-mercapto-5-methyl-1,3,4-thiadiazole (7.5 g., 0.075 mol) in acetone (100 ml.) and the solution was refluxed until the reaction was completed as indicated by the disappearance of the acetoxy carbonyl band in the infrared absorption spectrum. During the reflux period the reaction was maintained at about pH 7.5 by the addition of 6 N HCl. The solution was cooled and acidified to pH 3.5 with 6 N HCl and the solid 7-amino-3-(5-methyl-1,3,4-thiadiazol-2-ylthiomethyl)-3 - cephem - 4-carboxylic acid was collected, washed with water and then acetone, and dried.

The above product (3.44 g., 0.01 mol) was added to a solution of potassium cyanate (1.21 g., 0.015 mol) in water (15 ml.) and the reaction was stirred at room temperature until all the solid was dissolved, about 3–4 hours. The solution was filtered into acetone (200 ml.) and the precipitated potassium salt of the title compound was collected, washed with acetone, and dried. The salt was dissolved in water and the solution was acidified to pH 1 with dilute HCl. The product was collect, washed with water, and dried.

EXAMPLE 2

3-(4-methyl-1,2,4-triazol-3-ylthiomethyl)-7-ureido-3-cephem-4-carboxylic acid

Potassium cyanate (1.21 g., 0.015 mol) was dissolved in water (35 ml.) and 7-amino-3-(4-methyl-1,2,4-triazol-3-ylthiomethyl)-3-cephem-4-carboxylic acid (3.27 g., 0.01 mol) [prepared according to the procedure in Example 1 using 3-mercapto-4-methyl-1,2,4-triazole and 7-ACA] was added. After stirring 3 hours at room temperature, the reaction was filtered with acetone (400 ml.). The title compound as its potassium salt was collected, washed with acetone and dried.

EXAMPLE 3

3-(1-methyltetrazol-5-ylthiomethyl)-7-ureido-3-cephem-4-carboxylic acid

When 5-mercapto-1-methyltetrazole was reacted with 7-ACA as in Example 1, 7-amino-3-(1-methyltetrazol-5-ylthiomethyl)-3-cephem-4-carboxylic acid was obtained. This product (3.28 g., 0.01 mol) was added to a solution of potassium cyanate (1.21 g., 0.015 mol) in water (15 ml.). After stirring 45 minutes at room temperature the solution was filtered into acetone (200 ml.) and the precipitated potassium salt was collected.

EXAMPLE 4

When the appropriate 7-amino - 3 - (heterocycliothiomethyl)-3-cephem-4-carboxylic acid is reacted with potassium cyanate according to the procedure of Example 3, the following compounds are obtained.

3-(1,3-4-thiadiazol-2-ylthiomethyl)-7-ureido-3-cephem-4-carboxylic acid
3-(5-trifluoromethyl-1,3,4-thiadiazol-2-ylthiomethyl)-7-ureido-3-cephem-4-carboxylic acid
3-(tetrazol-5-ylthiomethyl)-7-ureido-3-cephem-4-carboxylic acid
3-(5-ethyl-1,3,4-thiadiazol-2-ylthiomethyl)-7-ureido-3-cephem-4-carboxylic acid
3-(5-n-butyl-1,3,4-thiadiazol-2-ylthiomethyl)-7-ureido-3-cephem-4-carboxylic acid
3-(3-methylthio-1,2,4-thiadiazol-5-ylthiomethyl)-7-ureido-3-cephem-4-carboxylic acid
3-(3-methyl-1,2,4-thiadiazol-5-ylthiomethyl)7-ureido-3-cephem-4-carboxylic acid
3-(2-amino-1,3,4-thiadiazol-5-ylthiomethyl)-7-ureido-3-cephem-4-carboxylic acid.

EXAMPLE 5

The following cephalosporins are obtained when potassium cyanate is reacted according to Example 1 with the corresponding 7-amino-3 - (heterocyliothiomethyl) - 3-cephem-4-carboxylic acid.

3-(1,2,4-triazol-3-ylthiomethyl)-7-ureido-3-cephem-4-carboxylic acid
3-(5-methyl-1,2,4-triazol-3-ylthiomethyl)-7-ureido-3-cephem-4-carboxylic acid
3-(4,5-dimethyl-1,2,4-triazol-3-ylthiomethyl)-7-ureido-3-cephem-4-carboxylic acid
3-(2,5-dimethyl-1,2,4-triazol-3-ylthiomethyl)-7-ureido-3-cephem-4-carboxylic acid
3-(4-methyl-5-trifluoromethyl-1,2,4-triazol-3-ylthiomethyl)-7-ureido-3-cephem-4-carboxylic acid
3-(5-ethyl-1,2,4-triazol-3-ylthiomethyl)-7-ureido-3-cephem-4-carboxylic acid
3-(4-ethyl-1,2,4-triazol-3-ylthiomethyl-7-ureido-3-cephem-4-carboxylic acid
3-(2-methyl-1,2,4-triazol-3-ylthiomethyl)-7-ureido-3-cephem-4-carboxylic acid
3-(2-ethyl-1,2,4-triazol-3-ylthiomethyl)-7-ureido-3-cephem-4-carboxylic acid
3-(1,3,4-oxidazol-2-ylthiomethyl)-7-ureido-3-cephem-4-carboxylic acid
3-(5-methyl-1,3,4-oxadiazol-2-ylthiomethyl)-7-ureido-3-cephem-4-carboxylic acid.

EXAMPLE 6

When potassium cyanate is reacted according to the procedure of Example 1 with the corresponding 7-amino-3 - (heterocyclicthiomethyl)-3-cephem-4-carboxylic acid the following cephalosporins will be obtained.

3-(pyrazin-2-ylthiomethyl)-7-uredio-3-cephem-4-carboxylic acid
3-(3-methylpyrazin-2-ylthiomethyl)-7-ureido-3-cephem-4-carboxylic acid
3-(pyrimid-2-ylthiomethyl)-7-ureido-3-cephem-4-carboxylic acid
3-(4-methylpyrimid-2-ylthiomethyl)-7-ureido-3-cephem-4-carboxylic acid
3-(pyrimid-4-ylthiomethyl)-7-ureido-3-cephem-4-carboxylic acid
3-(pyrid-2-ylthiomethyl)-7-ureido-3-cephem-4-carboxylic acid.

EXAMPLE 7

An injectable pharmaceutical composition is formed by adding 2 ml. of sterile water or sterile saline solution to 500 mg. of potassium 3-(5-methyl-1,3,4-thiadiazol-2-ylthiomethyl)-7-ureido-3-cephem-4-carboxylate.

Compositions of potassium 3-(4-methyl-1,2,4-triazol-3-ylthiomethyl)-7-ureido-3-cephem-4-carboxylate and potassium 3-(1-methyltetrazol-5-ylthiomethyl)-7-uredio - 3-cephem-4-carboxylate may be formulated in a similar manner.

EXAMPLE 8

When the appropriate 7-amino - 3 - (heterocyclicthiomethyl)-3-cephem-4-carboxylic acid is reacted with potassium cyanate according to Example 1 the following cephalosporins are obtained.

3-(4-cyclopropyl-1,2,4-triazol-3-ylthiomethyl)-7-uredio-3-cephem-4-carboxylic acid
3-(4-allyl-1,2,4-triazol-3-ylthiomethyl)-7-ureido-3-cephem-4-carboxylic acid
3-(5-methoxy-1,2,4-triazol-3-ylthiomethyl)-7-ureido-3-cephem-4-carboxylic acid
3-(2-dimethylamino-1,3,4-thiadiazol-5-ylthiomethyl)-7-ureido-3-cephem-4-carboxylic acid
3-(5-bromo-1,2,4-triazol-5-ylthiomethyl)-7-ureido-3-cephem-4-carboxylic acid.

What is claimed is:
1. A compound of the formula

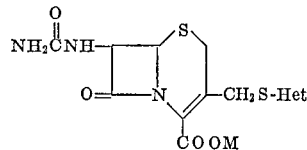

where
Het is a 5 or 6 membered heterocyclic ring containing 1 to 4 atoms selected from the group, N, O, and S, unsubstituted with from one to two groups selected from the group consisting of lower alkyl of 1–4 carbon atoms, lower alkoxy of 1–4 carbon atoms, cyclopropyl, allyl, $CF_3$, $SCH_3$, halogen, amino, lower alkylamino or dialkylamino each alkyl containing 1–4 carbon atoms; and
M is hydrogen, alkali metal cation, alkaline earth cation, or ammonium cation.

2. A compound as claimed in claim 1 where Het is 1,3,4 - thiadiazol-2-yl unsubstituted or optionally substituted with lower alkyl (1–4 carbon atoms), lower alkoxy (1–4 carbon atoms), cyclopropyl, allyl, $CF_3$, $SCH_3$, or halogen.

3. A compound as claimed in claim 1 where Het is 1,2,4-triazol-3-yl unsubstituted or optionally substituted with lower alkyl (1–4 carbon atoms), lower alkoxy (1–4 carbon atoms), cyclopropyl, allyl, $CF_3$, $SCH_3$, or halogen.

4. A compound as claimed in claim 1 where Het is 1,3,4-oxadiazol-2-yl unsubstituted or optionally substituted with lower alkyl (1–4 carbon atoms), lower alkoxy (1–4 carbon atoms), cyclopropyl, allyl, $CF_3$, $SCH_3$, or halogen.

5. A compound as claimed in claim 1 where Het is tetrazol-5-yl unsubstituted or optionally substituted with lower alkyl (1–4 carbon atoms), lower alkoxy (1–4 carbon atoms, cyclopropyl, allyl, $CF_3$, $SCH_3$, or halogen.

6. A compound as claimed in claim 2, being the compound 3-(5-methyl-1,3,4-thiadizol - 2 - ylthiomethyl)-7-ureido-3-cephem-4-carboxylic acid.

7. A compound as claimed in claim 3, being the compound of 3-(4-methyl-1,2,4-triazol - 3 - ylthiomethyl)-7-ureido-3-cephem-4-carboxylic acid.

8. A compound as claimed in claim 5, being the compound of 3-(1-methyltetrazol-5-ylthiomethyl)-7-ureido-3-cephem-4-carboxylic acid.

9. A compound as claimed in claim 3, being the compound of 2-(4-ethyl-1,2,4-triazol-3-ylthiomethyl)-7-ureido-3-cephem-4-carboxylic acid.

10. A compound as claimed in claim 2, being the compound 3-(5-trifluoromethyl-1,3,4-thiadiazol-2-ylthiomethyl)-7-ureido-3-cephem-4-carboxylic acid.

References Cited

UNITED STATES PATENTS

| | | | |
|---|---|---|---|
| 3,673,183 | 6/1972 | Erickson | 260—243 C |
| 3,687,948 | 8/1972 | Crast | 260—243 C |
| 3,687,949 | 8/1972 | Holdrege | 260—243 C |

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,772,286  Dated November 13, 1973

Inventor(s) John R. E. Hoover

It is certified that error appears in the above-identified patent and that said Letters Patent are hereby corrected as shown below:

Column 2, line 16, "does" should read ---dose--- .

Column 4, line 43, "unsubstituted" should read ---unsubstituted or substituted---.

Column 4, line 71, "thiadizol" should read---thiadiazol---.

Signed and sealed this 2nd day of April 1974.

(SEAL)
Attest:

EDWARD M.FLETCHER,JR.
Attesting Officer

C. MARSHALL DANN
Commissioner of Patents